(12) United States Patent
Book et al.

(10) Patent No.: US 6,271,467 B1
(45) Date of Patent: Aug. 7, 2001

(54) ADJUSTABLE HV/LV PROTECTIVE THROAT

(75) Inventors: William J. Book, Jefferson City; Keith Hemeyer, Chamois, both of MO (US); David A. Reinke, Springfield, IL (US)

(73) Assignee: ABB Power T&D Company Inc., Raleigh, NC (US)

( * ) Notice: Subject to any disclaimer, the term of this patent is extended or adjusted under 35 U.S.C. 154(b) by 0 days.

(21) Appl. No.: 09/653,774

(22) Filed: Sep. 1, 2000

(51) Int. Cl.⁷ .................................................. H02G 3/04
(52) U.S. Cl. ............................... 174/48; 174/50; 248/906; 439/535
(58) Field of Search .................................. 174/48, 50, 66, 174/67, 58; 220/241, 242, 3.2, 3.3, 3.8, 402; 248/906; 439/535

(56) References Cited

U.S. PATENT DOCUMENTS

| | | | | |
|---|---|---|---|---|
| 3,620,404 | * | 11/1971 | Grasso ............................ | 220/18 |
| 4,794,207 | * | 12/1988 | Norberg et al. .................. | 174/48 |
| 4,872,512 | * | 10/1989 | Multer .............................. | 169/51 |
| 5,189,259 | * | 2/1993 | Carson et al. .................... | 174/66 |
| 5,380,951 | * | 1/1995 | Comerci et al. .................. | 174/48 |
| 5,861,576 | * | 1/1999 | Langston et al. ................. | 174/48 |
| 6,133,524 | * | 10/2000 | Bosse, Jr. ......................... | 174/48 |

* cited by examiner

Primary Examiner—Dean A. Reichard
Assistant Examiner—Dhiru R Patel
(74) Attorney, Agent, or Firm—Woodcock Washburn Kurtz Mackiewicz & Norris LLP

(57) ABSTRACT

An adjustable throat for protecting electrical connections between two mating pieces of electrical equipment such as a transformer and associated switchgear is disclosed. The adjustable throat includes two telescoping tubular members each having flanges at one end thereof with oversized holes for connection respectively to a transformer and associated switchgear. The holes allow for vertical and horizontal adjustment to provide for final adjustment in these directions. One of the tubular members also has elongated open ended slots to allow the throat to be adjusted in and out to allow final connection to the switchgear without the need for minor movement of the gear.

5 Claims, 3 Drawing Sheets

ADJUSTABLE HV/LV PROTECTIVE THROAT

BACKGROUND OF THE INVENTION

1. Field of the Invention

This invention relates to an adjustable throat for protecting electrical connections between two mating pieces of electrical equipment, and, more specifically to an adjustable HV/LV throat for protecting electrical connections between a transformer and associated switchgear.

2. Description of the Prior Art

In practice, transformers are connected with associated switch gear by HV/LV bushings. It would be desirable to provide an adjustable throat for protecting such electrical connections between two mating pieces of electrical equipment. It would be desirable for the throat to allow for vertical and horizontal adjustment to allow for final adjustment in these directions and also to allow the throat to be adjusted in and out to allow final connection to the switch gear without the need for minor movement of the gear.

SUMMARY OF THE INVENTION

In accordance with one aspect of the invention there is provided an adjustable throat for protecting electrical connections between two mating pieces of electrical equipment such as a transformer and associated switch gear. The adjustable throat includes a first throat piece having a tubular portion and a flange extending around one end of the tubular portion, a second throat piece having a tubular portion and a flange extending around one end of the tubular portion, the first and second throat pieces having tubular portions dimensioned to telescope with respect to each other, the flanges and the throat pieces having holes therein for connecting one of the throat pieces to a transformer and the other of the throat pieces to associated switchgear and the tubular portions of the throat pieces having structure to provide in and out adjustment with respect to each other as well as the ability to lock the throat pieces in final position. A weather resistant sealing gasket is located between the tubular portions of the throat pieces. Further in accordance with the invention the holes in at least one of the flanges in the throat pieces are oversized and allow for vertical and horizontal adjustment to allow for final adjustment in these directions with respect to the mating pieces of electrical equipment.

BRIEF DESCRIPTION OF THE DRAWINGS

For a more detailed disclosure of the invention and for further objects and advantages thereof, reference is to be had to the following description taken in conjunction with the accompanying drawings.

DESCRIPTION OF THE PREFERRED EMBODIMENT

Figure 1A:
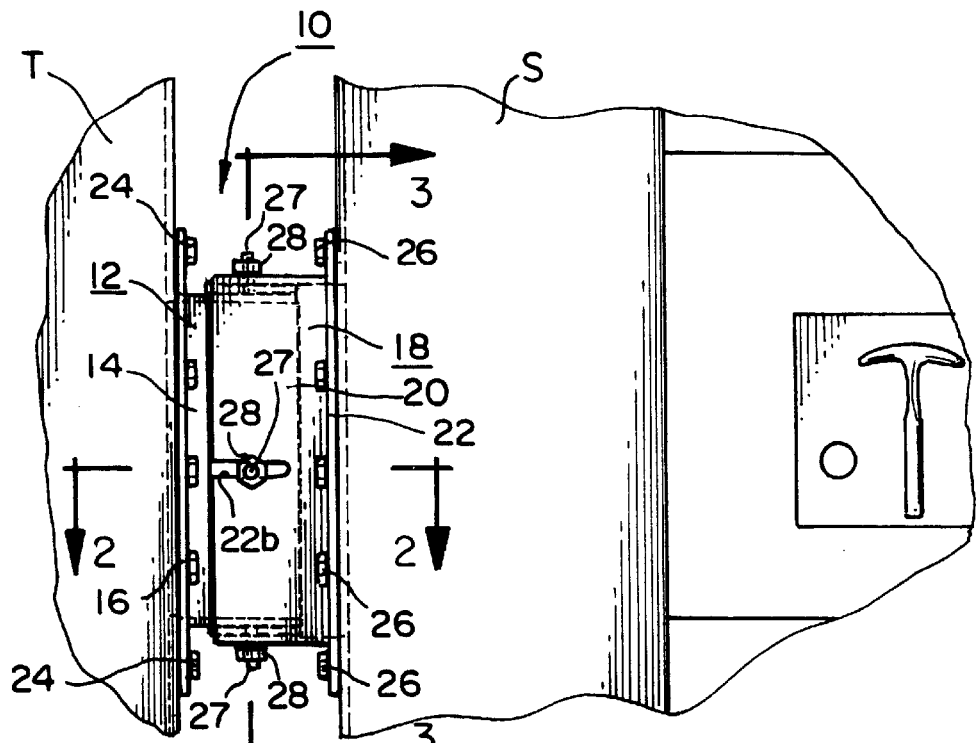
FIG. 1A is a side elevational view of an adjustable throat embodying the present invention for protecting electrical connections between a transformer and associated switch gear.
Figure 1B:
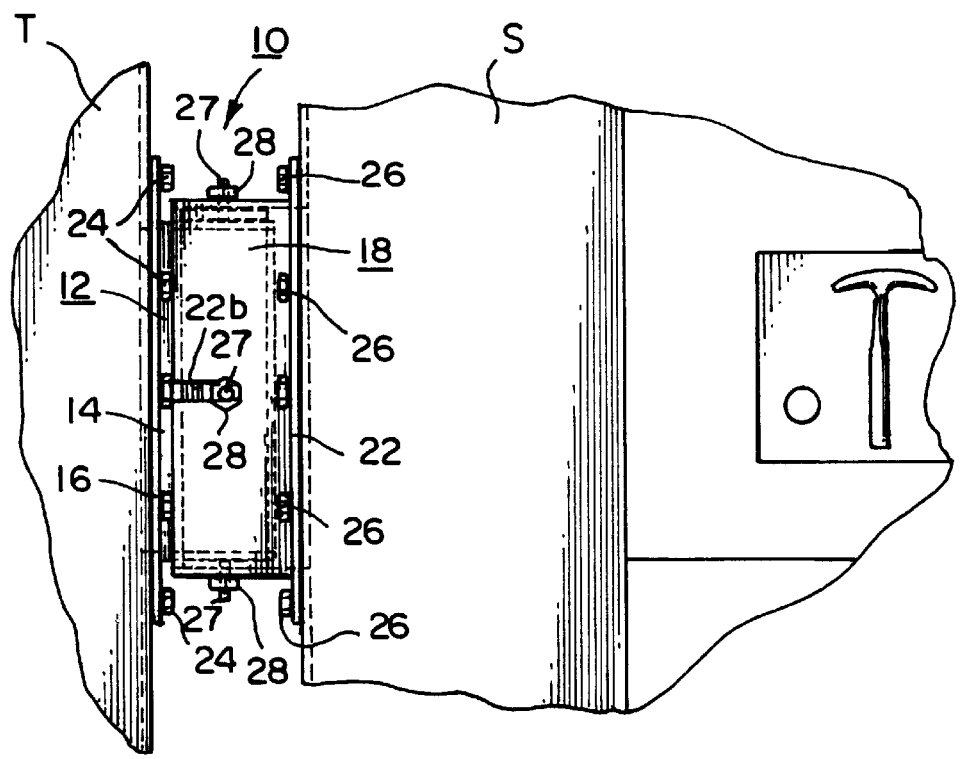
FIG. 1B is a view similar to FIG. 1A showing the adjustable throat in a different telescoped position.

Referring to the drawings, there is shown in FIGS. 1A and 1B the new adjustable throat 10 according to the present invention for protecting electrical connections between two mating pieces of electrical equipment such as a transformer T and associated switchgear S. The electrical connections are not shown in FIGS. 1A and 1B but they would be the conventional HV/LV bushings between the transformer and the switchgear. These electrical connections would be located within the adjustable throat 10. The adjustable throat 10 is shown in two different positions in FIGS. 1A and 1B. The adjustable throat 10 is shown in an expanded position in FIG. 1A and in a contracted position in FIG. 1B since the transformer T and switch gear S are farther apart in FIG. 1A then there are in FIG. 1B.

Figure 4:
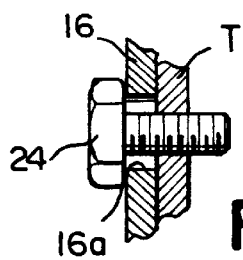
FIG. 4 is an enlarged sectional view taken along the lines 4—4 in FIG. 2.
Figure 2:
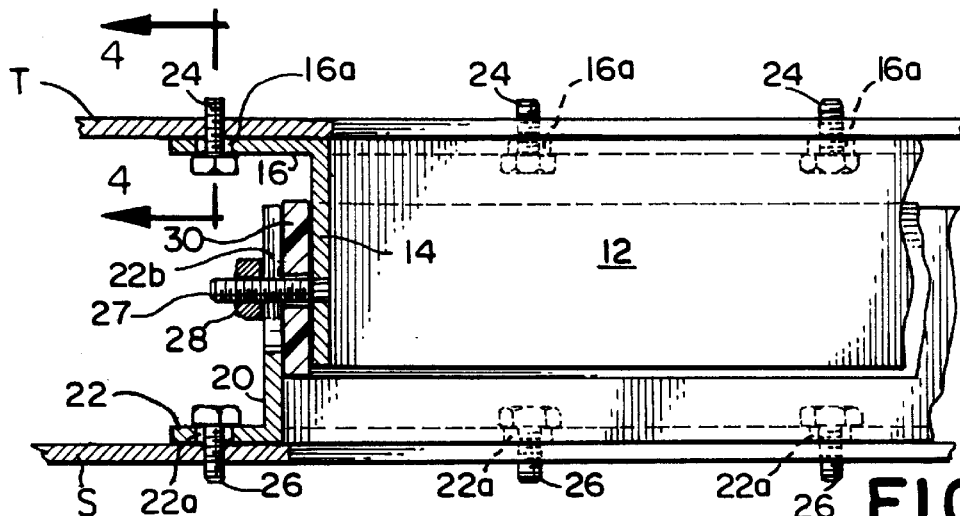
FIG. 2 is a sectional view taken along the lines 2—2 in FIG. 1A.
Figure 5:
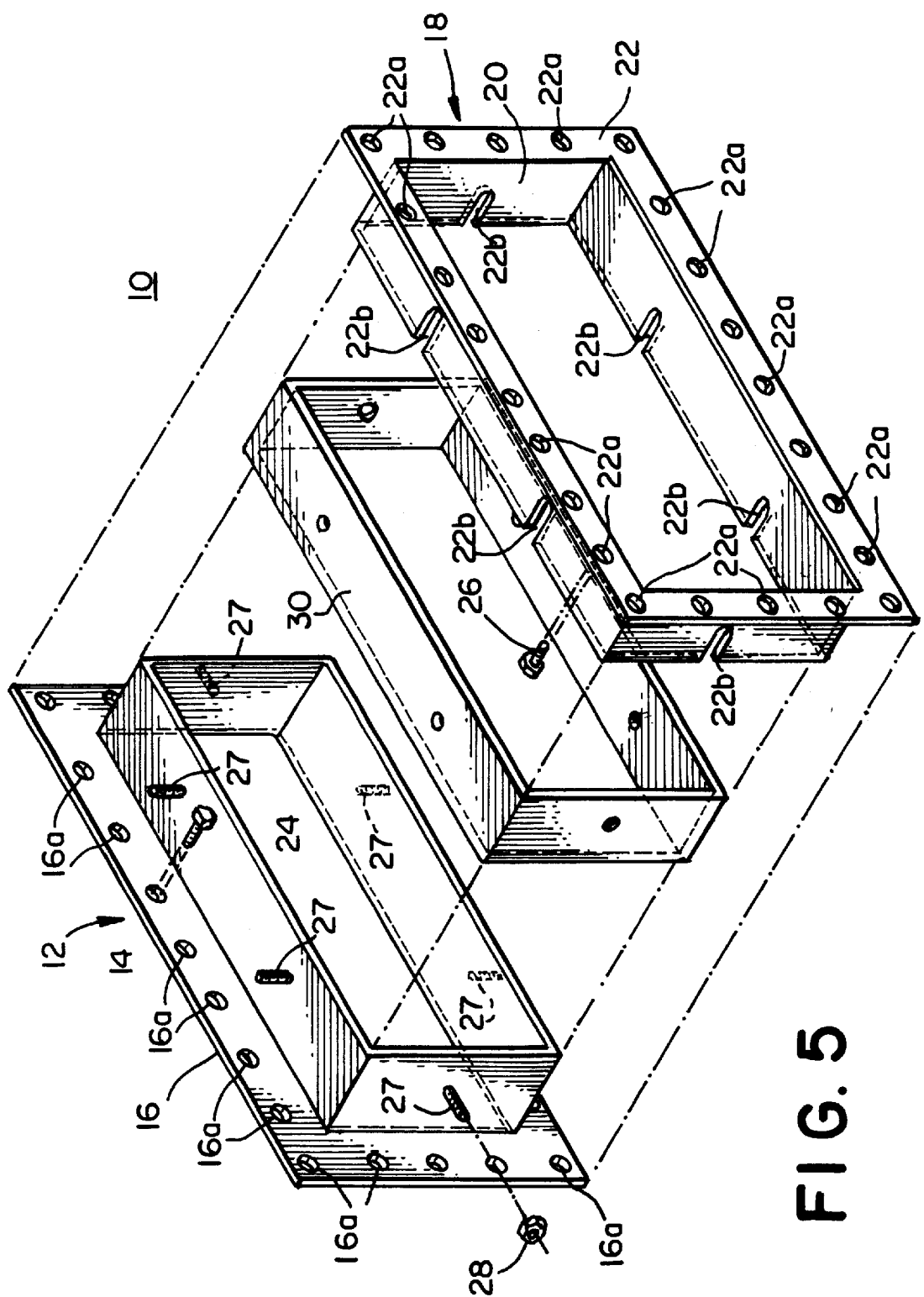
FIG. 5 is an exploded perspective view of the adjustable throat shown in FIGS. 1A and 1B.

As best seen in FIG. 5 the adjustable throat 10 includes a first throat piece 12 having a tubular portion 14 and a flange 16 extending around one end of the tubular portion 14. The adjustable throat 10 also includes a section throat piece 18 having a tubular portion 20 and a flange 22 extending around one end of the tubular portion 20. The first and second throat pieces 12 and 18 having their tubular portions 14 and 20 dimensioned to telescope with respect to each other. As may be seen in FIGS. 2 and 5 the flange 16 is provided with a plurality of holes 16a around its periphery for receiving screws 24 which extend therethrough and threadedly engage the adjacent wall of the transformer T. This is best seen in FIG. 2. The holes 16a in the flange 16 preferably are oversized, best seen in FIG. 4, and allow for vertical and horizontal adjustment to allow for final adjustment in these directions of the flange of the tubular throat piece 12 with respect to the transformer T. Similarly, the flange 22 of the tubular throat piece 18 is provided with a plurality of holes 22a around its periphery for receiving screws 26 which extend therethrough and threadedly engage the adjacent wall of the switchgear S. This is best seen in FIG. 2. The holes 22a in the flange 22 preferably are oversized and allow for vertical and horizontal adjustment to allow for final adjustment in these directions of the flange of the tubular throat piece 18 with respect to the switchgear S.

Figure 3:
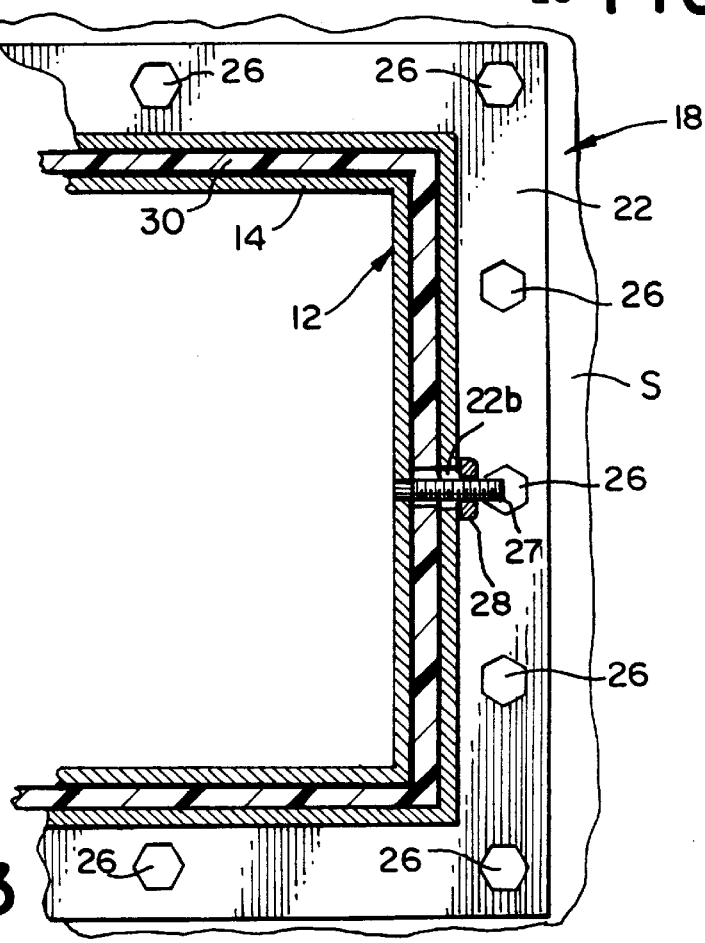
FIG. 3 is a fractional sectional view on enlarged scale taken along the lines 3—3 in FIG. 1A.

To provide longitudinal or in and out adjustment of the throat 10, the tubular portion 20 of the outer throat piece 18 is provided with open ended slots 22b. These slots 22b extend through the end of the tubular portion 20 opposite the flange 22. The inner throat piece 12 is provided on its tubular portion 14 with threaded studs 27. The threaded studs 27 have one end secured to the tubular portion 14 and extend outwardly therefrom. The threadedly studs 27 are adapted to be received within the open ended slots 22b on the outer throat piece 18. This is best seen in FIGS. 1A, 1B and 5. The threaded studs 27 are adapted to receive a nut member 28. The joint between the two sleeves 14 and 20 of the throat pieces 12 and 18 is made weather resistant by means of a sealing gasket 30. As may be seen in FIGS. 3 and 5, the sealing gasket 30 extends around the periphery of the tubular portion 14 of the throat piece 12. The sealing gasket 30 may take various forms. For example, in one form the gasket material may be formed so that it slips on the edge of the inner sleeve 14 and engages the inner surface of the outer tubular member 20.

In installing the adjustable throat 10 between a transformer and mating switch gear, the flange 14 of the throat piece 12 is attached to the transformer and the flange of the outer throat piece 18 is attached to the adjacent switchgear. The oversized holes in the flanges allow for vertical and horizontal adjustment of the respective throat pieces for final adjustment in these directions. The adjustment slots 22b in the tubular portion 22 of the outer throat piece 18 allow the throat to be adjusted in and out to allow final connection to the switchgear without the need for minor movement of the gear. When the final connections are made, the throat 10 may be locked in position by securing the nuts 28 on the corresponding studs 27 in each of the slots 22b around the throat.

While a preferred embodiment of the invention has been described and illustrated, it is to be understood that further modifications thereof may be made without departing from the scope and spirit of the appended claims.

What is claimed is:

1. An adjustable throat for protecting electrical connections between first and second mating pieces of electrical equipment such as a transformer and associated switchgear comprising:

a first throat piece having a tubular portion and a flange extending around one end of said tubular portion, a second throat piece having a tubular portion and a flange extending around one end of said tubular portion, said first and second throat pieces having their tubular portions dimensioned to telescope with respect to each other, said flanges in said throat pieces having holes therein for connecting one of said throat pieces to said first piece of electrical equipment and the other of said throat pieces to said second piece of electrical equipment, and said tubular portions of said throat pieces having structure to provide in and out adjustment with respect to each other as well as the ability to lock said throat pieces in final position.

2. An adjustable throat according to claim 1 including a weather resistant gasket located substantially between the telescoping portions of said throat pieces.

3. An adjustable throat according to claim 1 wherein said holes in at least one of said flanges in said throat pieces are oversized and allow for vertical and horizontal adjustment to allow for final adjustment in these directions with respect to the mating pieces of electrical equipment.

4. An adjustable throat according to claim 3 wherein said holes in said flanges of both of said throat pieces are oversized.

5. An adjustable throat according to claim 1 wherein one of said tubular portions of said throat pieces has slot structure to provide for in and out adjustment.

* * * * *